July 14, 1953  J. A. GERHOLD  2,645,085
ROTARY PUMP AND MOTOR HYDRAULIC TRANSMISSION
Filed Nov. 4, 1947  7 Sheets-Sheet 1

INVENTOR
José Aderito Gerhold
BY
Robert E. Burns
ATTORNEY

July 14, 1953   J. A. GERHOLD   2,645,085
ROTARY PUMP AND MOTOR HYDRAULIC TRANSMISSION
Filed Nov. 4, 1947   7 Sheets-Sheet 3

INVENTOR
José Aderito Gerhold
BY Robert E Burns
ATTORNEY

July 14, 1953  J. A. GERHOLD  2,645,085
ROTARY PUMP AND MOTOR HYDRAULIC TRANSMISSION
Filed Nov. 4, 1947  7 Sheets-Sheet 5

INVENTOR
José Aderito Gerhold
BY
Robert E Burns
ATTORNEY

July 14, 1953          J. A. GERHOLD          2,645,085
ROTARY PUMP AND MOTOR HYDRAULIC TRANSMISSION
Filed Nov. 4, 1947          7 Sheets-Sheet 6

INVENTOR
José Aderito Gerhold
BY
ATTORNEY

July 14, 1953 J. A. GERHOLD 2,645,085
ROTARY PUMP AND MOTOR HYDRAULIC TRANSMISSION
Filed Nov. 4, 1947 7 Sheets-Sheet 7

INVENTOR
José Aderito Gerhold
BY
ATTORNEY

Patented July 14, 1953

2,645,085

UNITED STATES PATENT OFFICE 2,645,085

ROTARY PUMP AND MOTOR HYDRAULIC TRANSMISSION

José Aderito Gerhold, San Antonio Oeste, Rio Negro, Argentina

Application November 4, 1947, Serial No. 784,026
In Argentina April 22, 1947

4 Claims. (Cl. 60—53)

1

This invention relates to improvements in hydraulic clutches, operating on the rotary pump principle, but provided with a simplified mechanism, thereby performing an important role as a power transmitting device in different types of drives and particularly in marine engines.

Many hydraulic clutches are used at present for this purpose but inasmuch as they generally operate through plates, the construction becomes so complicated that they cannot compete with systems of the friction type. This is confirmed by the fact that hydraulic clutches are not very popular despite the well known advantages of the hydraulic system.

Experiments carried out with hydraulic clutches have shown interesting technical features in various embodiments and considerable success has been attained as far as the clutch itself is concerned, leading to the conclusion that the regulation of the flow through the pump outlet to the pressure chamber may be carried out by means of a simple slide valve.

This has served as a basis for the improvements of the present invention, which may comprise a clutch controlling motion in one direction or, when the clutch is formed with an expansible chamber motor the motion can be reversed whenever desired.

According to the invention, the pump rotor is combined with fixed partitions restricting the cavity of the rotor chamber so that the radial blades will effectively drive the liquid through outlets opening into the pressure chamber, the regulating and control valve operating to control the flow of liquid through said chamber. According to the position of the valve, the liquid will be confined so as to form an effective fluid block or the circuit will be opened until the maximum return flow has been achieved, corresponding to the neutral position of the slide valve, and in a third case the same valve will control the flow through the motor for the corresponding reverse motion.

One of the main objects of the invention is to provide a system as simple as those of the friction type clutches with all the benefits and advantages of a hydraulic system.

A further object of the invention is to facilitate the driving of vehicles and particularly of marine vessels in general, as the clutch provides forward and reverse motions by a very simple gearing operation.

A further object of this invention is to provide a clutch which will have long life since the rotors and other mechanisms are lubricated and operate in the oil serving as the fluid connecting element.

A still further object of the invention is to provide a simple operation by means of a single control lever, capable of acting for forward, neutral and reverse operation.

The above and other objects and advantages of the present invention will become apparent from the following description when read with reference to the accompanying drawings, corresponding to one of the preferred embodiments, by way of example.

The same reference characters have been used to indicate like or corresponding parts or elements throughout the different drawings.

Figure 1:
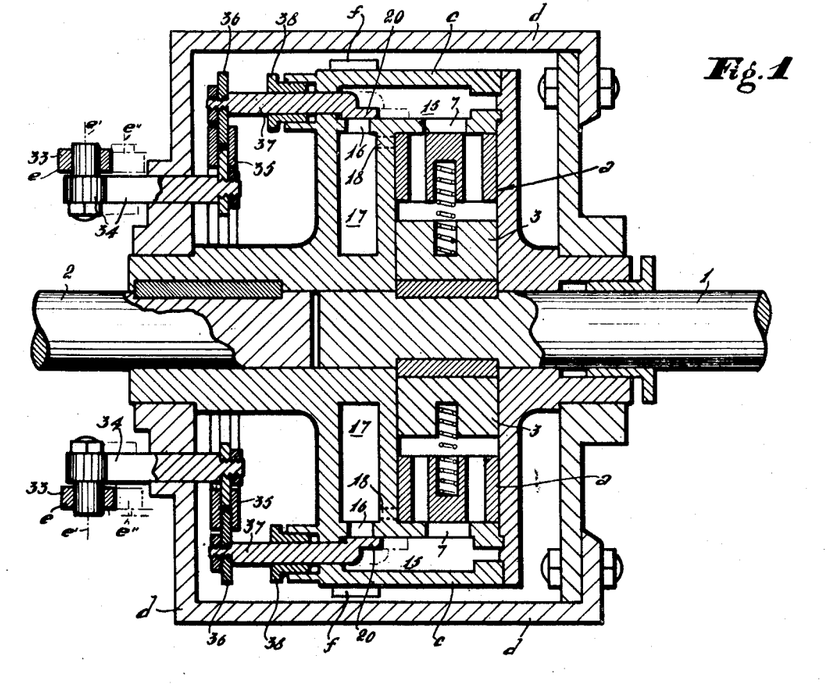
Fig. 1 is a longitudinal section view of the clutch which in this instance is a simple forward drive clutch.

With reference to the drawings, $a$ is the pump constituting the main element of the clutch and located within a rotary drum $c$ (Fig. 1). When the clutch is supplemented with reverse drive, said rotary drum $c$ is provided with an expansible chamber motor $b$ as shown in Figs. 2, 5, 7, 8, 9 and 10. Said rotary drum $c$ is mounted in frame $d$ which is fixed to the vehicle chassis.

Figure 2:
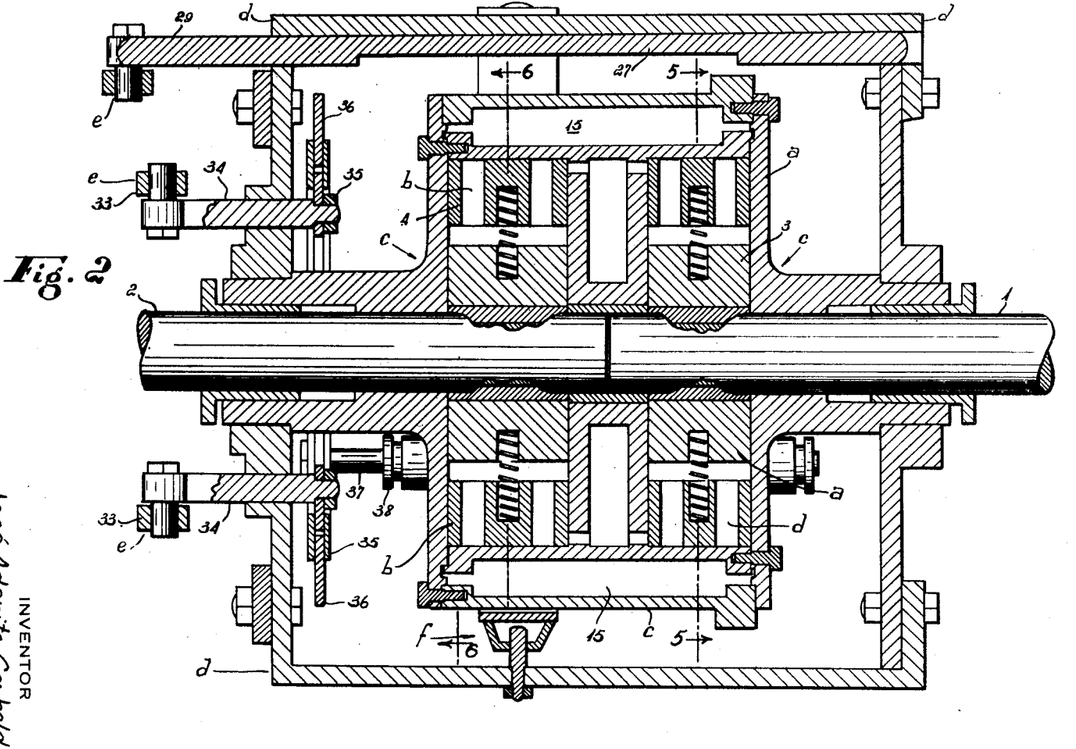
Fig. 2 is a longitudinal sectional view taken on line 2—2 of Fig. 4 of a modified clutch, supplemented with an expansible chamber motor for reverse drive.

The clutch control comprises a single lever $e$ serving for forward drive, reverse drive and neutral in the Fig. 2 device, as will be described hereinafter.

The driving shaft 1 is connected to the source of power which may be an explosion engine, an internal combustion engine, an electric motor, or the like. The driven shaft is indicated at 2 and extends to the propeller, wheels or other running means.

The driving shaft 1 has keyed thereto the rotor 3 of pump $a$, while shaft 2, in case the device is supplemented with reverse drive, has keyed thereto the rotor 4 of motor $b$; otherwise, in the case of a simple clutch as shown in Fig. 1, shaft 2 is journalled directly in the rotary drum $c$.

Figure 5:
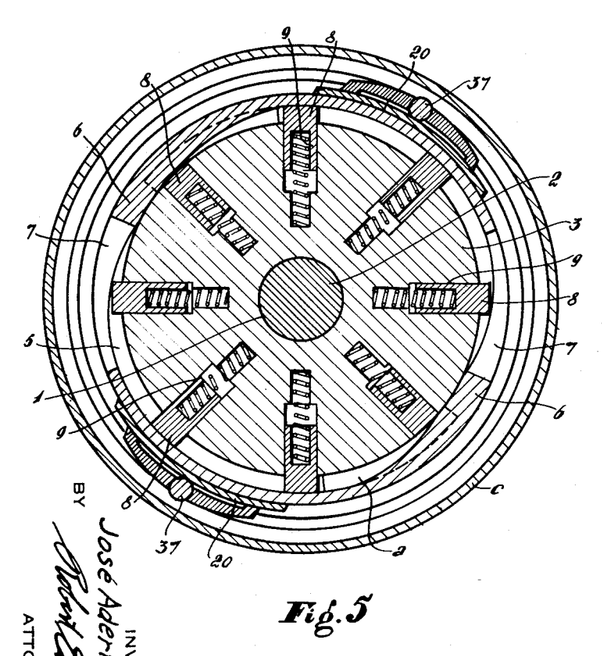
Fig. 5 is a cross-sectional view of the clutch through the center of the rotary pump, as indicated by the line 5—5 in Fig. 2.

Pump $a$ in its cavity 5 has partitions 6 (Fig. 5) which direct the flow of the oil through outlet openings 7 (Figs. 1 and 5). Rotor 3 of pump $a$ is provided with impelling blades 8 urged outwardly by springs 9, said blades urging the liquid that flows into the pump into the pressure chamber 15 through the openings 7.

Figure 6:
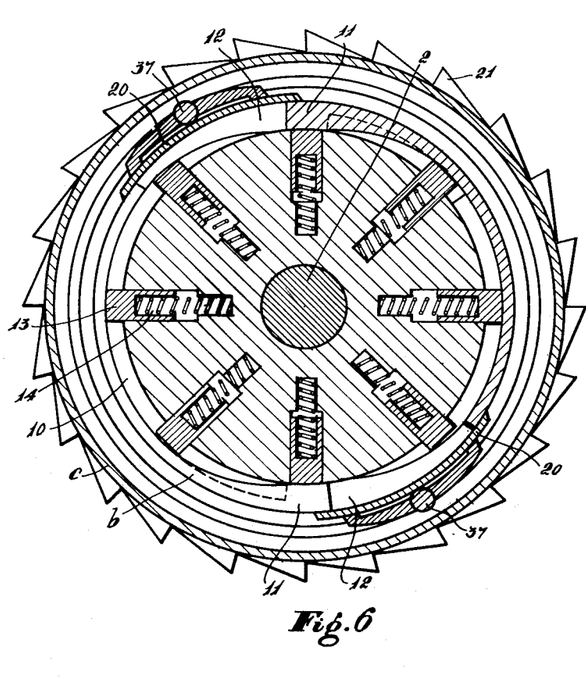
Fig. 6 is a cross-sectional view of the portion of the clutch corresponding to the reverse drive expansible chamber motor, as indicated by the line 6—6 in Fig. 2.

Motor $b$, similar to pump $a$, in its cavity 10 also has partitions 11 (Fig. 6) located adjacent the inlets 12 through which the oil coming from the pressure chamber 15 enters the motor to produce the rotation of the motor rotor which, for this purpose, is provided with blades 13 urged outwardly by springs 14.

Figure 7:
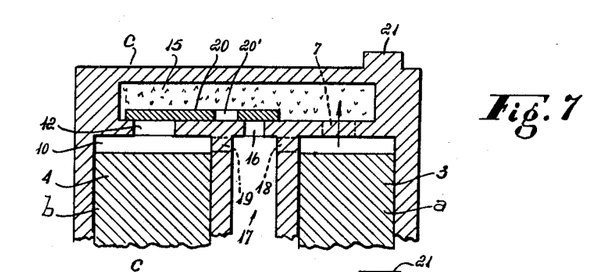
Fig. 7 shows the manner in which, with the valve in the position wherein it closes the bypasses from the pressure chamber, the oil from the pump will accumulate in said chamber, connecting the clutch for forward drive.
Figure 8:
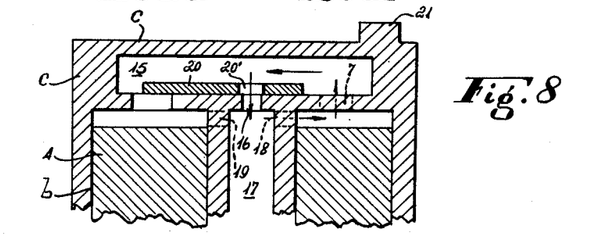
Fig. 8 is similar to Fig. 7, but showing the valve in neutral position, i. e., connecting the pressure chamber with the return chamber so as to bypass the pump, thus eliminating any driving action.
Figure 9:
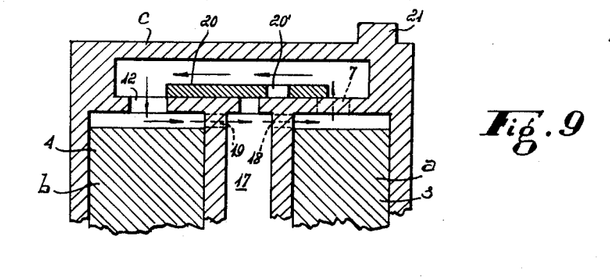
Fig. 9 shows the same assembly, with the valve in reverse drive position, wherein the oil from the pump reaches the motor so that with the general body held by the action of the brake, the driven shaft will rotate in a direction opposite to that of the driving shaft.
Figure 10:
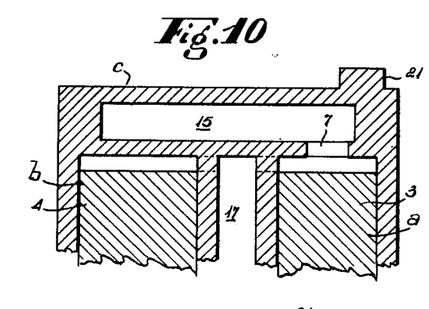
Fig. 10 shows a detail of the clutch, with the pump outlet feeding the pressure chamber.
Figure 11:
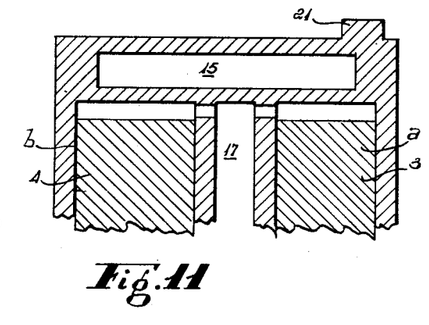
Fig. 11 is a view similar to Fig. 10, showing the return openings.
Figure 12:
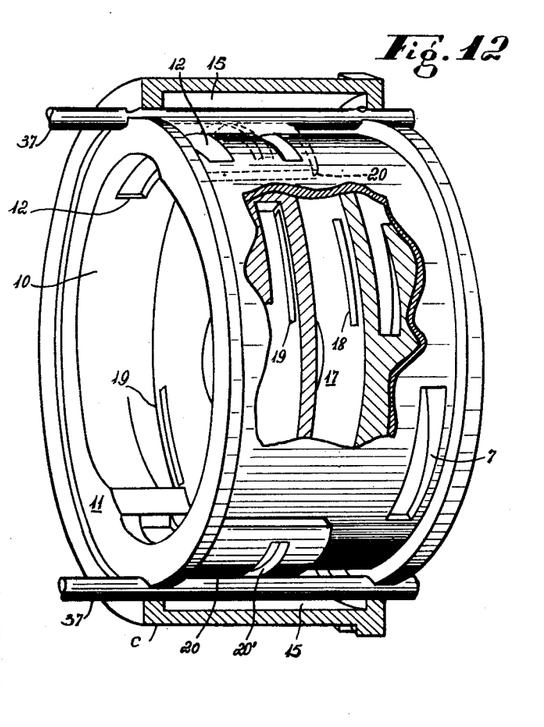
Fig. 12 is a perspective view of the rotary body, showing partially in section, taken approximately along the line 12—12 in Fig. 4, the arrangement of the outlet, inlet and return openings of the pump body, motor and pressure chamber.
Figure 13:
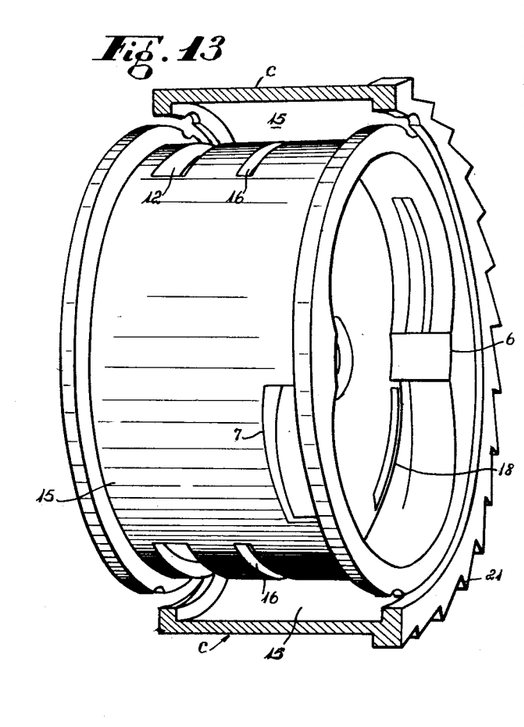
Fig. 13 is a perspective view, similar to Fig. 12, but showing a different aspect of the assembly.

Referring to Figs. 7, 8 and 9 pressure chamber 15 is provided with a discharge opening 16 leading to return chamber 17, and pressure chamber 15 has a further outlet 12 leading to motor $b$. These three openings 7, 12 and 17 are controlled by a slide valve 20 according to the desired motion to be given to shaft 2.

Return chamber 17 is in communication with pump $a$ by means of an opening 18 constituting the inlet for pump $a$, in order to allow the fluid to flow back to pump $a$ when shaft 2 is not being driven.

Return chamber 17 is in communication by means of an opening 19 with the motor $b$, opening 19 constituting the outlet for the fluid from motor $b$ when reverse drive of shaft 2 is desired.

In pressure chamber 15 a slide valve 20 is provided, valve 20 having a port 20'. The slide valve when placed in the position shown in Fig. 7, will close the two pressure chamber outlets 16 and 12, so that the liquid discharged by pump $a$ will accumulate in pressure chamber 15 and upon gaining pressure, will form a fluid block so that drum $c$ will follow the rotary motion of the pump rotor. Thus, the entire body with all the elements thereof will act as a unit and shaft 2, which is keyed to rotor 4 of motor $b$ (Figs. 2, 6, 7, 8 and 9) or to drum $c$ (Fig. 1), will rotate in the same direction as driving shaft 1, thus providing forward motion.

If valve 20 is placed in the position shown in Fig. 8, the oil delivered from pump $a$ to chamber 15 will pass through port 20' and opening 16, to chamber 17, returning to pump $a$, through opening 18 in a by-pass circuit. Thus, the rotation of driving shaft 1 will cause the rotation of pump rotor 3 but not of drum $c$ since there is no fluid block between the rotor and the walls of drum $c$, due to the fact that the liquid circulates freely; consequently, the position of valve 20, as shown in Fig. 8, corresponds to neutral. When valve 20 is carried to the position shown in Fig. 9, this will close opening 16 and open inlet 12 to the motor, whereby the liquid from pump $a$ will flow into chamber 15 and from this pass into motor $b$, actuating rotor 4 alone, without drum $c$, and inasmuch as rotation of the rotor of motor $b$ is opposite to that of pump $a$, the rotation of rotor 4 wlil impart to driven shaft 2 a reverse motion relative to that of shaft 1.

Inasmuch as the action of rotor 3 might influence the rotary drum $c$, notwithstanding the precision with which the apparatus can be made, in order to render said drum $c$ non-responsive to the rotation of rotor 3 when valve 20 is in neutral position, drum $c$ is provided with a brake $f$ that will lock drum $c$.

Figure 4:
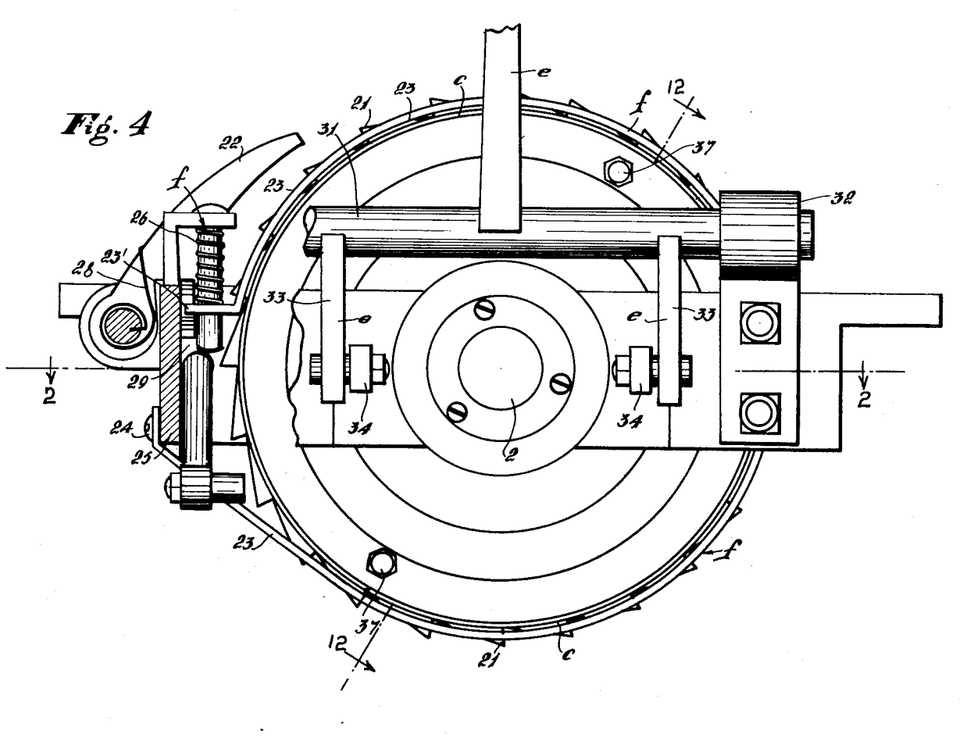
Fig. 4 is an external view of the clutch as seen from the end corresponding to the control lever, as indicated by the line 4—4 in Fig. 3.

In order that rotor 4 of motor $b$ may effect reverse drive, drum $c$ is also provided with a ratchet wheel 21, which is in due time locked by engagement with a pawl 22, Fig. 4.

Figure 3:
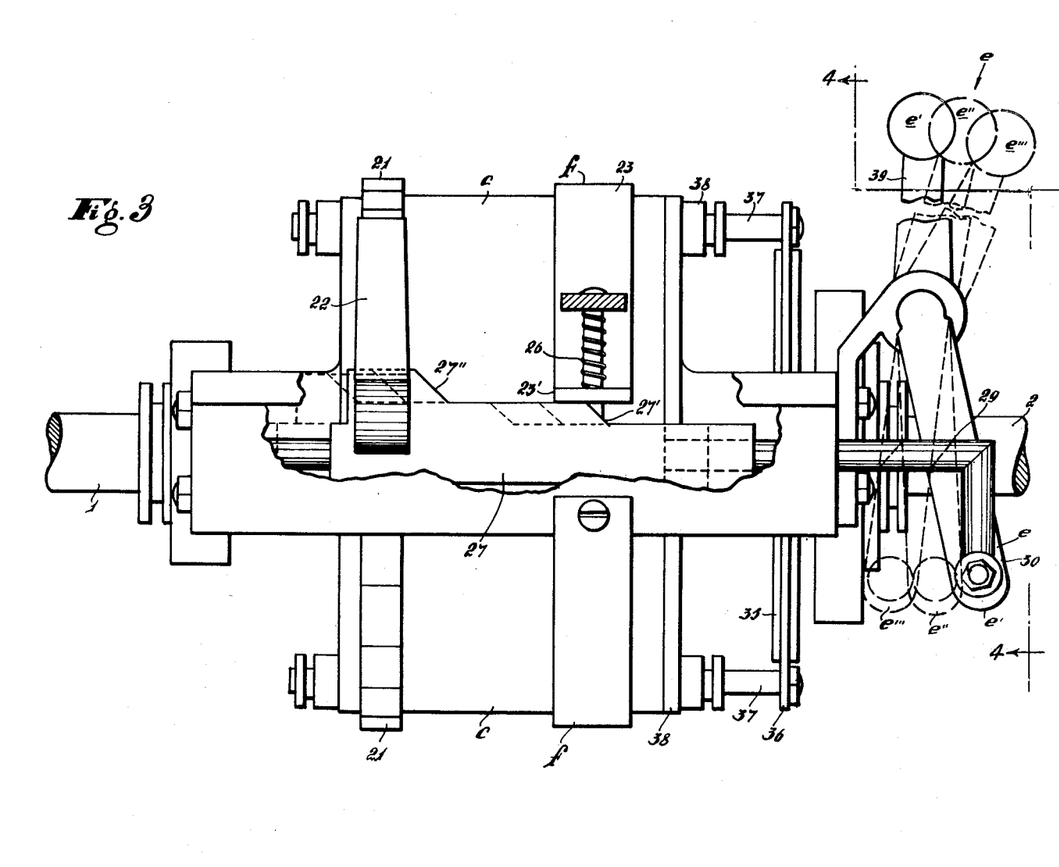
Fig. 3 is an external view of the main portion of the control lever with the movable body of the clutch.

Brake $f$ is formed by a clamp 23 fixed at one end to a support 25 by means of a screw 24, while the opposite end of said clamp 23 has an extension 23' pressed by a spring 26. The tension of spring 26 closes clamp 23, thereby adjusting it against rotary drum $c$ so as to hold the latter and prevent it from following rotor 3. Extension 23' of clamp 23 is located within the path of a slidable cam bar 27 constituting the control of brake $f$ and at the same time of pawl 22 (Fig. 3).

For this purpose, cam bar 27 has an inclined cam surface 27' acting on extension 23' so as to open the clamp 23 and release the rotary drum $c$, when the latter should be responsive to forward drive.

Inasmuch as clamp 23 is provided with a spring 26, the withdrawal of cam surface 27', due to the shifting of cam bar 27 will cause the closure of clamp 23 by means of spring action. Cam bar 27 is provided with a second inclined cam surface 27'' located so as to raise pawl 22 and release the ratchet wheel 21 and as pawl 22 is provided with a spring 28, the removal of cam surface 27'' due displacement of cam bar 27, will cause pawl 22 to engage the teeth of ratchet wheel 21, thereby locking drum $c$ against forward rotation, when reverse drive is required.

Cam bar 27 is attached to stem 29 which is connected to the arm 30 of the general control lever $e$. Lever $e$ is connected to a shaft 31, which is held in bearings 32.

Shaft 31 has two arms 33 and stems 34 are connected to arms 33. Stems 34 pass through holes drilled in the walls of frame $d$. Therefore, stems 34 act as slides guided by the holes of frame $d$. Inside frame $d$, stems 34 are connected to ring 35. Ring 36 is guided by ring 35. Ring 36 can rotate with drum $c$.

Ring 35 controls ring 36 in the direction of the slidable displacement thereof, but allows it to rotate about the axis concentric to shaft 2.

Stems 37 are attached to ring 36 (Fig. 1). Stems 37 pass through holes drilled in drum $c$, said holes having packings 38 serving as a guide and tight closure for slidable stems 37.

Slide valves 20 are attached to stems 37. Valves 20, controlled by stems 37, regulate the functioning of the clutch as described above.

Control lever e is provided with a control arm by means of which lever e may assume one of the 3 positions e', e'' and e''', indicated in Fig. 3.

Position e' corresponds to forward drive, inasmuch as lever e, by means of all connecting parts, controls valve 20 carrying it to the position shown in Fig. 7. In this case, the liquid issued by the pump a forms a fluid block in chamber 15, causing the rotation of rotary drum c, and consequently of shaft 2 as if it were integral with shaft 1.

Position e'' corresponds to neutral, inasmuch as valve 20 will assume the position shown in Fig. 8. The liquid will circulate in a bypass circuit, without any action on the drum c. Brake f will hold drum c in an idle position, since cam surface 27' is released from engagement with extension 23' of clamp 23, and therefore spring 26 will cause the engagement of clamp 23.

Position e''' corresponds to reverse drive. In this case, valve 20 will be carried to the position shown in Figure 9. The liquid issued by the pump will enter the casing of motor b which rotates in an opposite direction relative to pump a. The rotor of motor b, being connected to shaft 2, will cause the reverse rotation of shaft 2.

In position e''', cam surface 27'' will release pawl 22, so that the latter will hold drum c against forward rotation by engaging one of the teeth of ratchet wheel 21.

In case the apparatus has no reverse drive means, as in the embodiment shown in Fig. 1, lever e will have only position e' and e'', for forward drive and neutral.

*Operation*

In the case of the simple device, as shown in Fig. 1, upon starting the engine, shaft 1 will cause the rotation of rotor 3 of pump a, so that the oil impelled by blades 8 will pass through outlet 7 to pressure chamber 15.

If it is desired to keep the engine running idle, i. e. without the motion being transmitted to the propeller or wheels coupled to the driven shaft 2, lever e should be placed in the position e'' shown in Fig. 1. Liquid issued by pump a, after entering pressure chamber 15, will pass through opening 16 into return chamber 17, returning to pump a, through opening 18. This position e'' corresponds to neutral. Arm 30 of lever e will shift cam bar 27 so that cam surface 27' thereof will release extension 23', thereby causing the closure of ring 23 of brake f and consequently locking drum c so as to prevent the latter from following the movement of pump a.

When it is desired to start the vehicle, lever e should be shifted to the position e', whereby cam bar 27 will insert cam surface 27', opening brake f so as to release drum c. On the other hand the arms 33 and stems 34 of lever e will carry valves 20 to the position of closure of opening 16, thereby accumulating the liquid issued by pump a to the extent of causing drum c to follow the movements of rotor 3 to which said shaft 2 will be responsive as if it were integral with shaft 1. By shifting slowly said lever e from neutral position e'' to driving position e', the movement of the vehicle will be initiated gradually, as the action will be progressive while opening 16 is being closed.

In the case of the embodiment shown in Figs. 2, 6, 7, 8, 9, 10, 11, 12 and 13, the neutral position occurs under the same conditions, i. e., in the position e'' of lever e, wherein cam surface 27' will be positioned so that the brake will hold the drum c, while positioning port 20' to pass oil through opening 16, which will lead the oil to the return opening 18.

Similarly, by slowly shifting lever e to the position e', progressive starting of the vehicle will be accomplished, after releasing drum c by inserting cam surface 27'. Valve 20 will close gradually the return passage through opening 16, and will cause the liquid to act as a connecting means between the rotor of pump a and drum c, until a single mass is formed with said liquid, thereby causing the rotation of drum c together with driving shaft 1, said rotation being followed by the entire assembly of the motor b. Thus, said shaft 2 being keyed to rotor 4, will also rotate.

For reverse drive, it will be sufficient to carry lever e to the position e''' (Fig. 3) wherein cam surface 27'' will come out of engagement with pawl 22 so as to lock drum c on one of the teeth of ratchet wheel 21. Also, in shifting valve 20 to the position shown in Fig. 9, this will allow the liquid entering chamber 15 to pass to the casing of motor b, where rotor 4 thereof will rotate in a direction opposite to that of rotor 3, allowing shaft 2 to rotate in a reverse direction with respect to shaft 1.

It is evident that many changes and modifications may be made in the construction and operation of the clutch as disclosed herein, without departing from the scope of the invention as set forth in the following claims.

I claim:

1. A hydraulic clutch comprising a driving shaft and a driven shaft coaxially arranged, an end of said driving shaft and an end of said driven shaft being disposed coaxially with a rotary drum, said drum being connected to said driven shaft and being mounted in a frame, a rotary pump having the rotor thereof keyed to the end of said driving shaft, an expansible fluid chamber disposed within said drum between the peripheral wall thereof and the periphery of the rotor of said pump, and an intermediate chamber disposed within said drum coaxially with said pump, said rotary pump having outlets leading to said pressure chamber and an inlet communicating with said intermediate chamber, said pressure chamber being provided with outlets leading to said intermediate chamber and inlets communicating with the outlets of said rotary pump, and valves coupled to a control lever for controlling the outlets of said pressure chamber to control flow of fluid from said pressure chamber into said intermediate chamber.

2. A hydraulic transmission comprising a driving shaft and a driven shaft coaxially arranged, an end of said driving shaft and end of said driven shaft being disposed coaxially with a rotary drum, said drum being mounted in a frame, a rotary pump having the rotor thereof keyed to the end of said driving shaft, an expansible chamber motor arranged within said drum and having the rotor thereof coupled to the end of said driven shaft, an expansible fluid chamber disposed within said drum between the peripheral wall thereof and the periphery of the rotor of said pump, and an intermediate chamber disposed within said drum coaxially with said pump, said rotary pump having an inlet communicating with said intermediate chamber, said pressure chamber having outlets leading to said intermediate chamber and to said motor and inlets communicating with said rotary pump, said motor having an outlet communicating with said intermediate chamber, and valves coupled to a control lever for controlling the outlets of said pressure chamber to control flow of fluid from said pressure chamber into said intermediate chamber.

3. A hydraulic transmission comprising a driving shaft and a driven shaft coaxially arranged, an end of said driving shaft and an end of said driven shaft being disposed coaxially with a rotary drum, said drum being connected to said driven shaft and being mounted in a frame, a rotary pump having the rotor thereof keyed to the end of said driving shaft, an expansible fluid chamber disposed within said drum between the peripheral wall thereof and the periphery of the rotor of said pump, and an intermediate chamber disposed within said drum coaxially with said pump, said rotary pump having outlets leading to said pressure chamber and an inlet communicating with said intermediate chamber, said pressure chamber being provided with outlets leading to said intermediate chamber and inlets communicating with the outlets of said rotary pump, valves, coupled to a control lever for controlling the outlets of said pressure chamber to control flow of fluid from said pressure chamber into said intermediate chamber, and a brake for holding said rotary drum idle, said brake being governed by a cam surface formed on a cam bar, the latter being coupled to said control lever.

4. A hydraulic transmission comprising a driving shaft and a driven shaft coaxially arranged, an end of said driving shaft and an end of said driven shaft being disposed coaxially with a rotary drum, said drum being connected to said driven shaft and being mounted in a frame, a rotary pump having the rotor thereof keyed to the end of said driving shaft, an expansible fluid chamber disposed within said drum between the peripheral wall thereof and the periphery of the rotor of said pump, and an intermediate chamber disposed within said drum coaxially with said pump, said rotary pump having outlets leading to said pressure chamber and an inlet communicating with said intermediate chamber, said pressure chamber being provided with outlets leading to said intermediate chamber and inlets communicating with the outlets of said rotary pump, and valves coupled to a control lever for controlling the outlets of said pressure chamber to control flow of fluid from said pressure chamber into said intermediate chamber, a ratchet wheel on said drum, and a pawl engaging said ratchet wheel and being controlled by a cam surface formed on a cam bar coupled to said control lever.

JOSÉ ADERITO GERHOLD.

References Cited in the file of this patent

UNITED STATES PATENTS

| Number | Name | Date |
|---|---|---|
| 890,533 | Schmucker | June 9, 1908 |
| 952,217 | Schlachter | Mar. 15, 1910 |
| 1,203,745 | Kilgore | Nov. 7, 1916 |
| 1,242,389 | Sweet | Oct. 9, 1917 |
| 1,365,553 | Sheriff | Jan. 11, 1921 |
| 1,545,678 | Miller | July 14, 1925 |
| 1,671,750 | Staude | May 29, 1928 |
| 1,797,439 | Napier | Mar. 24, 1931 |
| 1,998,922 | Chamberlain et al. | Apr. 23, 1935 |
| 2,052,429 | Tyler | Aug. 25, 1936 |
| 2,108,270 | Rogers | Feb. 15, 1938 |